J. W. WILSON.

Rotary Road Scraper.

No. 6,555. Reissued July 20, 1875.

WITNESSES:

C. Newux

Alex F. Roberts

INVENTOR:

Jacob W. Wilson

BY

Munn & Co.

ATTORNEYS.

N. PETERS, PHOTO-LITHOGRAPHER, WASHINGTON, D. C.

UNITED STATES PATENT OFFICE.

JACOB W. WILSON, OF SOMERFORD, OHIO.

IMPROVEMENT IN ROTARY ROAD-SCRAPERS.

Specification forming part of Letters Patent No. 88,686, dated April 6, 1869; reissue No. 6,555, dated July 20, 1875; application filed June 19, 1875.

*To all whom it may concern:*

Figure 1:
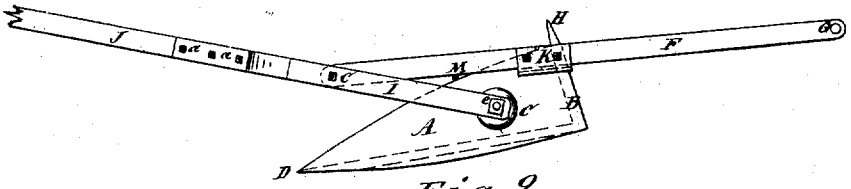
Figure 2:
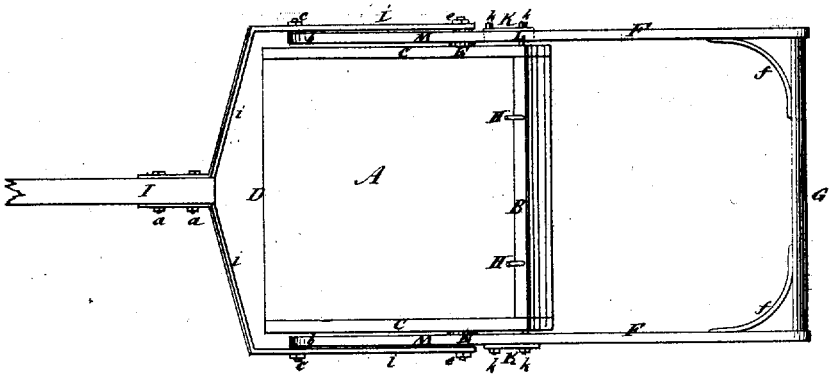
Figure 3:
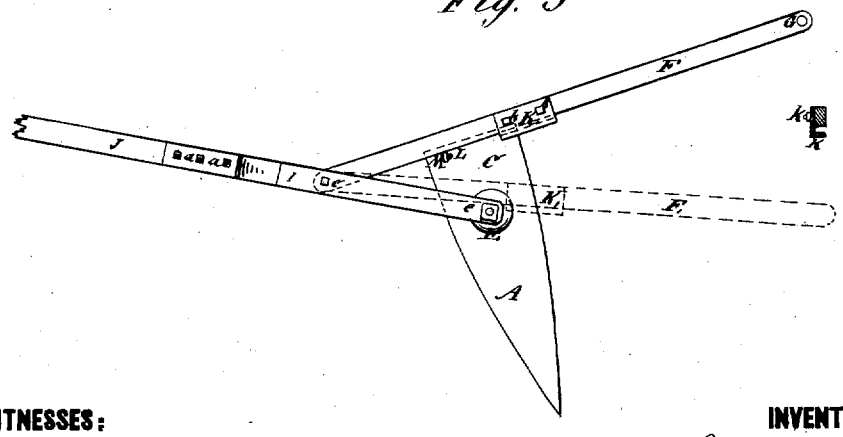

Be it known that I, JACOB W. WILSON, of Somerford, in the county of Madison and State of Ohio, have invented a new and useful Improvement in Rotary Road-Scrapers, of which the following is a specification:

Figure 1 is an elevation of my improved scraper. Fig. 2 is a plan of the same. Fig. 3 is an elevation of the same when in position for leveling down earth.

Similar letters of reference indicate corresponding parts.

The nature of my invention consists in the novel construction and arrangement of the mechanism used in combination with a road-scraper for the purpose of operating the same, whereby I am enabled to regulate the depth to which the scraper is to cut into the earth to be scraped, to hold the scraper in a proper position for transporting the earth scraped up, to hold the scraper in a suitable position for leveling down the earth after it is scraped to the desired position, and to readily revolve the scraper, so as to discharge its load, and get it in position for a new one, or to perform any service that may be required of the scraper with but very little muscular exertion, and in a very effectual manner, the whole machine being of simple construction and moderate cost, and not liable to get out of repair.

To enable others skilled in the art to make and use my invention, I will proceed to describe its construction and operation.

The scraper A is of an ordinary form, and, as represented in drawing, is made with bottom D, with sharp front edge, sides C C, and rear end piece B, the several parts being arranged as shown; but an ordinary cast-iron scraper may be used, if preferred. To the sides C C of the scraper A are secured the standards E E, which have pivot-bolts in their ends, which pass through holes in the tongue-pieces I I, which are secured on them by means of the nuts *e e*, as shown. The tongue-pieces I I are bent into the form shown, and are secured to the tongue J by two or more bolts, *a a*, as shown, said tongue serving as a means of attaching the team to the machine. The handles F F are united at their rear ends by the cross-bar G, and are braced by braces *f f*, inserted in the angles between the cross-bar and handles, as shown. The front ends of these handles F F are pivoted, by bolts *c c*, to the tongue-pieces I I at points near the inward bends in said irons, as shown. These bolts *c c* pass through holes in the pieces F F and I I, and through the washers *b b*, which are placed between the tongue-pieces and handles, as shown, to prevent any rubbing between them. To these handles F F are secured the irons K K by means of the screws or bolts *k k*, as shown. These irons K K are of an L-shaped cross-section, and are so arranged on the handles F as to leave a slot between the arm of the L and the lower face of the handle F, as seen in detached cross-section in Fig. 3. The bolts or pins L L are secured in the sides C C of the scraper A, in such a manner as that when the scraper is at work scraping or transporting earth, their ends slide in the slots between the irons K K and handles F F, as seen in Figs. 1 and 2. The spikes or pins H H are inserted in the upper edge of the rear piece B of the scraper A, and the pins M M are inserted in the lower faces of the handles F F, as shown.

The operation of my improved scraper is as follows: The motive power being secured to the tongue J, the handles F F are pressed down by the operator, who grasps the cross-bar G, and this presses down on the pins L L, which depresses the rear part, and, of course, elevates the sharp front edge of the scraper A, so that it can be drawn to the desired location for working. When the scraper is to be loaded, the handles F F are raised by the operator, which causes the front of the scraper to dip into the earth, through the action of the irons K K on the pieces L L, in a manner readily seen, and the dip of the scraper while being loaded is easily regulated by raising or lowering the handles F F. When the load is obtained, the handles F F are pressed down, as before described, and the load is then drawn to any desired place. When the scraper is to be unloaded, the operator raises the handles F F until the front of the scraper A catches in the ground, and thus tilts the scraper up in the position shown in Fig. 3. The pins L L then strike against the pins M M in the handles F F, and thus hold the scraper in the position shown in Fig. 3, when it can be used to level off the earth which it has thrown in a heap, as is readily seen. After this leveling off is finished, the operator raises the handles F F until the pins L L slip under the pins M M, when the scraper A falls forward, and the pins H H stick in the ground, when it is readily seen that the forward movement of the team will cause the scraper to make another half-revolution, and thus come back to its original position. As soon as the operator has raised the handles F F sufficiently to let the pins L L pass under the pins M M, he releases said handles, which then drop down onto the standards E E, as shown by dotted lines K F in Fig. 3. The pin L describes the arc of a circle (represented by circular dotted lines in Fig. 3) during the revolution of the scraper A, so that when the scraper comes back into the position shown in Fig. 1, said pins L L come back to their original positions in the slots between the handles F F and irons K K, when it is readily seen that the scraper can again be operated, as before shown.

It is readily seen that where there is no occasion for the scraper acting as a leveler for its own load, the operator, when desiring to unload the scraper, will first raise the handles F F until the scraper is tilted up; then, as soon as the pins L L pass out from the irons K K, he will raise the handles F F enough to allow the pins L L to pass under the pins M M, when the scraper A will turn over at once. By the connection of the handles to the bail or tongue pieces I in advance of pivots, the irons K swing eccentrically to the circles described by the pins L, and the relative arrangement of the irons and pins is such that the pins escape from the slots, when the handles are raised as high above the pivots E as the radius of the circle described by the pins, and they enter again when the handles are swung into the line of the tongue-pieces I, or so near it that the upper ends of the irons swing within the circle of the pins. This is due to the connection of the handles to the tongue-pieces in advance of the pivots, and the arrangement of the irons, for the pins to engage and disconnect with them automatically.

Having thus described my invention, I claim as new and desire to secure by Letters Patent—

1. The combination, in a revolving scraper, of handles pivoted to the tongue-pieces or yoke in advance of the pivots of the scraper, and connecting devices on the scraper, and the handles arranged to disconnect and connect automatically, substantially as specified.

2. The peculiar arrangement and combination of the scraper A, standards E E, tongue-pieces I I, and handles F F, the several parts being arranged substantially in the manner and for the purpose specified.

3. The L-shaped irons K K, when used in combination with the handles F F and the pins L L on the scraper A, substantially as and for the purpose specified.

4. The pins M M, when used in combination with the handles F F, pivoted to the tongue-pieces I I and pins L L, and the scraper A, substantially as and for the purpose herein specified.

5. The peculiar arrangement and combination of the scraper A, with the standards E E and pins L L, the tongue-pieces I I, and handles F F, with pins M M and L-shaped irons K K, the several parts being arranged substantially in the manner and for the purpose herein specified.

6. The rotary road-scraper herein described, composed essentially of the scraper A, with standards E E, pins L L, and spikes H H screwed thereto, the tongue-pieces I I, with tongue J, the pivot-bolts *c c*, with separating-washers *b b*, handles F F, with pins M M and L-shaped irons K K, and cross-bar G, with braces *f f*, the several parts being constructed and arranged substantially in the manner and for the purposes herein specified.

JACOB W. WILSON.

Witnesses:
WILLIAM SOWARD,
MARY E. SOWARD.